US011010151B2

(12) United States Patent
Hodges et al.

(10) Patent No.: US 11,010,151 B2
(45) Date of Patent: May 18, 2021

(54) SOFTWARE PATCH ORDERING

(71) Applicant: International Business Machines Corporation, Armonk, NY (US)

(72) Inventors: Ian M. Hodges, Horton Heath (GB); Michael Vrakopoulos, Southampton (GB); Payal Mehta, Woking (GB); Stephen Evans, Hampshire (GB); Stephen Hurst, Four Marks (GB); Andrew Wright, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/027,491

(22) Filed: Jul. 5, 2018

(65) Prior Publication Data

US 2020/0012486 A1 Jan. 9, 2020

(51) Int. Cl.
*G06F 8/65* (2018.01)
*G06F 16/28* (2019.01)

(52) U.S. Cl.
CPC .............. *G06F 8/65* (2013.01); *G06F 16/288* (2019.01)

(58) Field of Classification Search
CPC ................................ G06F 8/65; G06F 16/288
USPC .......................................................... 717/171
See application file for complete search history.

(56) References Cited

U.S. PATENT DOCUMENTS 7,552,430 B2 6/2009 Napier et al.
8,478,627 B2* 7/2013 Cantor .................. G06Q 10/06
705/7.28
8,539,474 B2 9/2013 Declercq et al.
8,677,348 B1 3/2014 Ramanathpura et al.
2004/0098667 A1* 5/2004 Atkinson ............ G06F 17/2205
715/239

(Continued)

FOREIGN PATENT DOCUMENTS

WO WO2017039588 3/2017

OTHER PUBLICATIONS

Colarik et al, Update/Patch Management Systems, Information Security Management, Education and Privacy, Kluwer Academic Publishers, ifip, pp. 67-80, 2004.

*Primary Examiner* — Jae U Jeon
*Assistant Examiner* — Bradford F Wheaton
(74) *Attorney, Agent, or Firm* — Schmeiser, Olsen & Watts, LLP; Brian Restauro

(57) ABSTRACT

A method and system for processing a plurality of unordered software patches for one or more computer readable software programs configured to be executed in a computer system. The unordered software patches are obtained. The unordered software patches include relationship information for defining a relationship the unordered software patches have with a second software patch. For each unordered software patch, the relationship information of the unordered software patch is analyzed to determine the relationship the unordered software patch has with the second software patch. An entry for each unordered software patch is stored in a relationship data store in the data processing system or computer system. The entry comprises dependency data representative of the determined relationship the unordered software patch has with the second software patch. The unordered software patches are ordered based on the dependency data in the relationship data store.

14 Claims, 15 Drawing Sheets

(56) References Cited

U.S. PATENT DOCUMENTS

| | | | |
|---|---|---|---|
| 2006/0064685 A1* | 3/2006 | DeFolo | G06F 8/658 |
| | | | 717/169 |
| 2008/0276217 A1* | 11/2008 | Nagaoka | G06F 8/71 |
| | | | 717/105 |
| 2009/0254896 A1 | 10/2009 | Khan | |
| 2010/0138822 A1* | 6/2010 | Miyazaki | G06F 8/658 |
| | | | 717/168 |
| 2010/0180104 A1* | 7/2010 | Henry | G06F 8/66 |
| | | | 712/208 |
| 2014/0380293 A1* | 12/2014 | Nagai | G06F 8/65 |
| | | | 717/168 |
| 2015/0178063 A1* | 6/2015 | Narkinsky | G06F 8/658 |
| | | | 717/168 |
| 2016/0117162 A1* | 4/2016 | Searle | H04L 41/082 |
| | | | 717/173 |
| 2017/0024801 A1* | 1/2017 | Sinopoli | G06F 3/0488 |
| 2017/0201850 A1* | 7/2017 | Raleigh | H04W 4/50 |

* cited by examiner

SOFTWARE PATCH ORDERING

TECHNICAL FIELD

The present invention relates to ordering the application, processing and installation of software patches or fixes.

BACKGROUND

Software patches ("patches") or fixes are commonly used to update a computer program and/or correct (i.e. fix) a problem with a computer program.

A computer system and its software may be maintained component-by-component, where a component may be an object module, or source sample, etc. Consequently, a software patch may be provided to implement a single replacement component which fixes an error in a component of a computer system or program. To maintain the integrity of a system/program, the patch installer must know and account for any relationships between patches supplied for installation. For example, if a patch relies on another patch to be installed on the system, such a relationship between patches is defined and a software installer will then check if the relationship is satisfied. By way of further example, typical relationships defined within patches are as follows:

Prerequisite (PRE)—the system/program must have the prerequisite patch installed before a new patch can be applied.

Supersedes (SUP)—the new patch totally replaces the superseded patch updating all parts that the superseded patch updated or created. Any relationships within the superseded patch must be brought forward to the new patch such that the superseded patch need not be applied.

Requires (REQ)—the new patch indicates that a required patch is to be installed prior to, or at the same time, as the new patch installation.

IF Requires (IFREQ)—the new patch indicates that IF an optional software component is installed then a required patch is to be installed prior to, or at the same time, as the new patch is installed.

Not Prerequisite (NPRE)—the system must NOT have the NPRE patch installed before the new patch can be applied.

Accordingly, for patches that are applied to maintain a system/program, a network of relationships may exist between the patches. The relationships may define an order in which the patches should be applied/processed/installed to ensure integrity or correct functioning of the system/program. By way of example, if a new patch "NEWPATCH" updates a component called "SAMPLE", and if the component "SAMPLE" was last updated by a previous patch "OLDPATCH", it will be appreciated that the new patch "NEWPATCH" must have the previous patch "OLDPATCH" as prerequisite so as to ensure consistency of the environment, since "OLDPATCH" may have introduced changes that "NEWPATCH" is reliant upon. Such a relationship may be represented as PRE OLDPATCH or SUP OLDPATCH.

To calculate the relationships between patches, a history of what patch last changed which component, e.g. "SAMPLE", must be maintained. When creating a new patch, the components changed in the prerequisite or superseded patch are used to interrogate the component history to obtain the last patch to change the component. This information is then used to auto generate PRE and SUP relationship information that the patch installer will enforce. This component history data store can be very long lived (decades) and when a new patch generation system is required to take over the work of an old patch generation system the component history data store is required to be migrated to a new format. This new format is understandable by the new patch generation system.

When the format and content of an old patch generation system is unknown and/or when the skills or resources required to extract relationship information is unavailable, it may be difficult to ascertain a history of pre-applied patches, let alone their relationships. Such information is required for any new patch generation system to correctly generate new patch relationship information for future patches.

SUMMARY

Embodiments of the present invention provide a computer-implemented method, and associated computer program product and data processing system, for processing a plurality of unordered software patches for one or more computer readable software programs configured to be executed in a computer system. The method comprises obtaining, by one or more processors of a data processing system, the plurality of unordered software patches, the software patches comprising relationship information for defining a relationship the unordered software patches have with a second software patch. For each unordered software patch of the plurality of software patches: the relationship information of the unordered software patch is analyzed, by the one or more processors, to determine the relationship the unordered software patch has with the second software patch. An entry for each unordered software patch is stored, by the one or more processors, in a relationship data store in the data processing system or computer system. The entry comprises dependency data representative of the determined relationship the unordered software patch has with the second software patch. The method further comprises ordering, by the one or more processors, the plurality of unordered software patches based on the dependency data in the relationship data store.

BRIEF DESCRIPTION OF THE DRAWINGS

Embodiments of the present invention will now be described, by way of example only, with reference to the following drawings.

DETAILED DESCRIPTION

Figure 1:
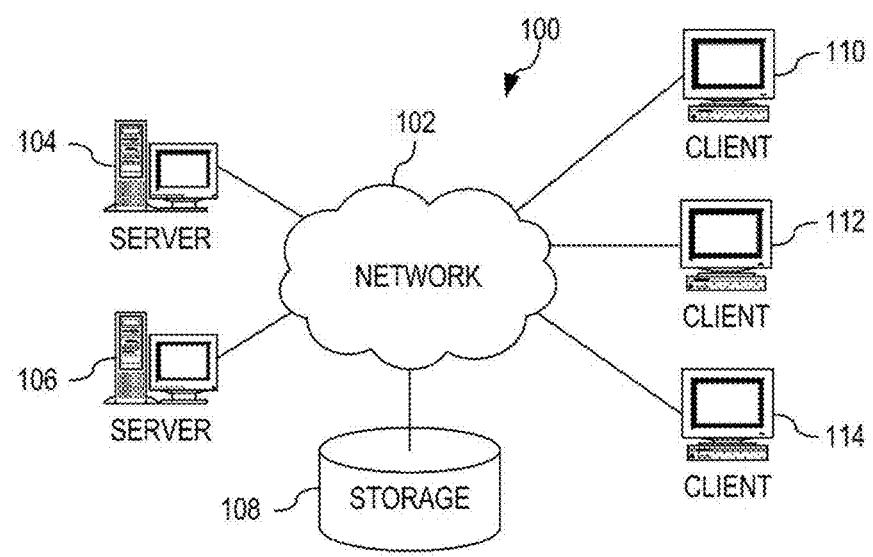
FIG. 1 depicts a pictorial representation of an example distributed system, which may be a computer system or data processing system, in which aspects of illustrative embodiments of the present invention may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer; i.e., is a computer-implementable method. The various steps of the method therefore reflect various parts of a computer program; e.g., various parts of one or more algorithms.

Also, in the context of the present application, a system may be a single device or a collection of distributed devices that are configured to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The present invention provides a method for ordering a plurality of unordered software patches for a computer system. Such ordered software patches may, in one embodiment, be used to rebuild a component history for a new patch generation system.

Accordingly, the present invention also provides a method for reproducing a software patch component history of a computer system.

The present invention further provides a computer program product including computer program code for implementing such a proposed method when executed on a processor of a computer system.

The present invention yet further provides a computer system configured to execute this computer program code.

The present invention also provides a system for ordering a plurality of unordered software patches for a computer system.

Embodiments of the present invention order (or sort) software patches in an order which, when executed in that order, re-creates a patch component data store for enabling patches to be generated with correct relationships among the patches. Rather than being based on a chronological or sequence metadata, such ordering or sorting may instead be based on relationships defined within the software patches. Embodiments of the present invention may thus create the equivalent of a 'patch manager'.

In embodiments of the present invention, the only source of information may be the patches themselves. To build up a history of which software patch changed what components, each patch may be processed in the order defined by the relationships. Otherwise the component update history may be reversed leading to later errors when a new patch is required.

Embodiments of the present invention may therefore determine an order in which a randomly-ordered (i.e., unordered) set of patches may be processed in order to build an accurate component history data store. Such embodiments may thus facilitate the re-creation of a software patch data store from existing software patches so as to enable future/subsequent software patches to be generated with correct relationships to enable the future/subsequent patches to be installed on a computer system with prior patch relationships enforced.

Embodiments of the present invention may utilize the nature and/or characteristics of a plurality of software patches (such as relationship information contained therein) so as to enable sorting the software patches into an order that may be advantageous. Approaches to sorting or re-ordering software patches may thus be provided due to the context of software patches having defined relationships with other software patches. Once sorted/ordered, the plurality of software patches may be used to accurately create a component patch history data store to store the component patch history, thus allowing further patches to be created with correct patch relationships.

By way of example, a company may have very old software patch maintenance systems that are no longer well understood (e.g., because the knowledge of the very old software patch maintenance systems is no longer in the company). As a result, harvesting information from these very old software patch maintenance systems in a reliable manner may be very difficult or impossible. Embodiments of the present invention may address this obstacle to rebuilding the component patch history of a product by using the software patches themselves as source of information for determining what patches changed what components of a system and what relationships between or among the patches exist. Embodiments of the present invention may take any set of software patches for a product release and order the patches based upon the relationships defined within the software patches. Once ordered, the software patches may then be processed to identify the components changed and update a store of data that records the order that a component is changed by what software patch. Software patch ordering information (e.g. the PRE, SUP, etc. statements) may also be recorded. Once this software patch ordering information is extracted and stored, any new software patch built by the system taking over software patch maintenance may correctly determine new software patch relationships that ensure a software environment is cohesive.

Embodiments of the present invention may therefore be employed to order a set of product release patches into an order that will reliably reproduce equivalent component history. Such embodiments may do this by using the relationships that the old system placed within the patches (e.g., statements defining relationships using terms such as PREs, SUPS, etc.). The determined order may be different from a patch production order and/or date order, but will ensure the component update relationships are exactly the same. For example, embodiments of the present invention may leverage the concept that a software patch which maintained a component that no other software patch has touched has no relationship to other patches and so may appear in the ordering sequence at any point.

The step of ordering may comprise, while the relationship data store comprises entries: adding one software patch of a plurality of unordered software patches to an ordered list of software patches based on the dependency data of the entries of the relationship data store; and removing from the relationship data store the entry for the software patch added to the ordered list.

Furthermore, adding one software patch of the plurality of unordered software patches to an ordered list may comprise analyzing the dependency data of the entries of the relationship data store to identify an independent software patch not having a relationship with any other software patch, and then selecting the identified independent software patch to be added to the ordered list.

Also, the step of ordering may further comprise: removing from the relationship data store dependency data representative of relationships other software patches have with the software patch added to the ordered list.

By way of example, the relationship information may comprise a statement identifying the second software patch and the relationship between the identified second software patch and the software patch comprising the relationship information. For instance, the relationship may define, in one embodiment, that the identified second software patch is: a prerequisite for; superseded by; required by; conditionally required by; or not to be installed prior to, the software patch comprising the relationship information.

In some embodiments, the step of ordering may further comprise, in response to the relationship data store comprising no entries: comparing the ordered list with the plurality of unordered software patches to determine if all software patches of the plurality of software patches are included in the ordered list; and generating an error signal if it is determined that not all software patches of the plurality of software patches are included in the ordered list.

Modifications and additional steps to traditional software patching systems and methods may also be implemented, which may enhance the value and utility of embodiments of the present invention.

Figure 2:
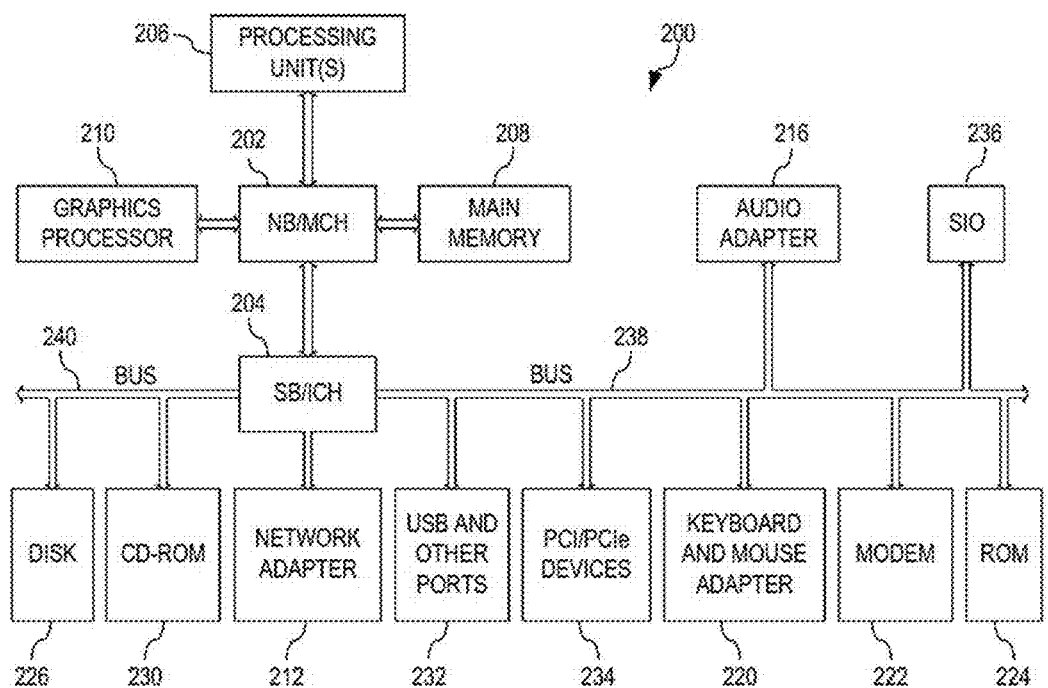
FIG. 2 is a block diagram of an example computer system in which aspects of the illustrative embodiments of the present invention may be implemented.

Illustrative embodiments may be utilized in many different types of computing environments. In order to provide a context for the description of elements and functionality of the illustrative embodiments, FIGS. 1 and 2 are provided hereafter as example systems in which aspects of the illustrative embodiments may be implemented. It should be appreciated that FIGS. 1 and 2 are only examples and are not intended to assert or imply any limitation with regard to the systems in which aspects or embodiments of the present invention may be implemented. Many modifications to the depicted environments may be made without departing from the scope of the present invention.

FIG. 1 depicts a pictorial representation of an example distributed system 100, which may be a computer system or data processing system, in which aspects of illustrative embodiments of the present invention may be implemented. Distributed system 100 may include a network of computers in which aspects of the illustrative embodiments of the present invention may be implemented. The distributed system 100 contains at least one network 102, which provides communication links between various devices and computers connected together within the distributed system 100. The network 102 may include connections, such as wire, wireless communication links, or fiber optic cables.

In the depicted example in FIG. 1, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed system 100 may include additional servers, clients, and other devices not shown.

In the depicted example in one embodiment, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprising thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments or systems in which the illustrative embodiments of the present invention may be implemented.

FIG. 2 is a block diagram of an example system 200, which may be a computer, a computer system, a data processing system, or a server, in which aspects of the illustrative embodiments of the present invention may be implemented. The system 200 is an example of a computer in one embodiment, such as client 110 in FIG. 1, in which computer readable program code or instructions implementing the processes for illustrative embodiments of the present invention may be located.

In the depicted example in FIG. 2, the system 200 employs a huh architecture including a north bridge and memory controller huh (NB/MCH) 202 and a south bridge and input/output (I/O) controller hub (SB/ICH) 204. One or more processing units 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226 (or generally, one or more hardware storage devices), a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java® programming system, may run in conjunction with the operating system and provides calls to the operating system from Java® programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as hard disk drive (HDD) 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB MCH 202 in FIG. 2. Generally, one or more memories implement embodiments of the present invention.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

As detailed above, proposed embodiments provide a method for sorting software patches into an order which, when executed in that order, re-creates a patch component data store for enabling patches to be generated correct relationships. Embodiments of the present invention may thus facilitate the creation of a 'patch manager' equivalent.

Accordingly, by way of explanation, an embodiment is next presented for ordering a plurality of unordered software patches for a computer system to create a data store of component and patch information reflecting the history of component updates.

By way of example, the content of a software patch may be represented as follows:
++PTF(UI42764)/*5655-Y0400-HCI7000*/.
++VER(C150) FMID(HCI7000)
PRE(UI35984, UI36648, UI37565, UI38573, UI38813, UI39529, UI39577, UI4101 3, UI41525, UI42269, UI42539)
SUP(UI36443, UI38004, UI38726, UI41125).
++IF FMID(JCI700M) THEN REQ(UI42765)

The above example software patch contains an identifier in the form of ++PTF(name), where name=UI42764, followed by relationship data. Contained in the ++VER statement are statements identifying other software patches and the relationship that this software patch UI42764 has with those other software patches. For instance, the above example software patch UI42764 supersedes software patches UI36443, UI38004, UI38726 and UI41125, thus updating all parts that the software patches UI36443, UI38004, UI38726 and UI41125 may have previously updated or created. Any relationships within software patches UI36443, UI38004, UI38726 and UI41125 should therefore be brought forward in to this example software patch UI42764 such that the old superseded patches need not be applied.

FIGS. 3 through 6G depict an exemplary implementation of an embodiment for ordering a plurality of unordered software patches for a computer system. More specifically, FIGS. 3, 4A, 5A and 6A are flow diagram depicting the various steps of the exemplary embodiment, and FIGS. 4B, 5B, and 6B-6G depict the various stales of the data structures (e.g., lists, maps and queues) of the embodiment during execution of the various steps of the flow diagrams.

In the Figures, the data structures are identified as follows:
DS1=Software patch element that contains an identifier (ID), relationship information to other patches and part changed ID and data.
DS2=Unordered List of supplied patches.
DS3=Map of supplied patches keyed by Patch ID.
DS4=Map of Relations keyed by Patch ID with the value of a Map (DS5).
DS5=Map of Relations Types keyed by Related Patch ID and with a value of the Relationship Type (PRE, SUP, etc.).
DS6=A queue of Ordered patches ready to process to build up a component history database.
DS7=A list of patches processed in the current iteration of the Unordered List (DS2).

Figure 3:
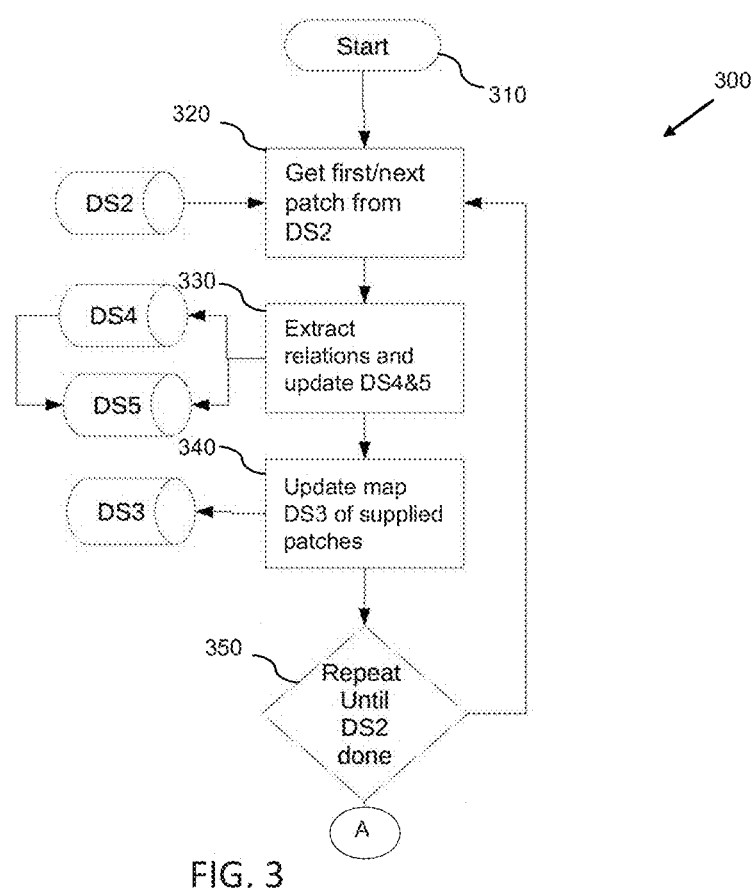
FIG. 3 is a flow diagram of a first stage of an exemplary embodiment of the present invention.

FIG. 3 is flow diagram of a first stage 300 of an exemplary embodiment of the present invention.

The first stage 300 begins in step 310 in which the plurality (e.g., a set) of unordered software patches DS1 for one or more computer readable software programs configured to be executed in a computer system are obtained and stored as an unordered list of software patches DS2.

The unordered software patches of the unordered list DS2 are then iterated across to inspect each patch and extract the defined relationships of each patch. This iterative process is undertaken in steps 320-350 of the first stage 300.

More specifically, in step 320, a current software patch is retrieved from the unordered list of software patches DS2 and then, in step 330, the relationships of the current patch are read, extracted and stored. Here, for each type of relationship (e.g., REQ, PRE, SUP, etc.) an entry in the Relations Type Map DS5 is stored. For instance, an entry in the Relations Type Map DS5 may comprise information including the related patch identifier and the relationship type. Also, if the current unordered patch DS1 does have relationships created, then the Relations Type Map (DS5) is also stored with a key of the current Patch ID in the Relations Map (DS4). Then, in step 340, the current unordered patch DS1 is placed in a Map of Supplied Patches DS3 keyed from the patch identifier. In step 350, it is determined if all the related patches to the current software patch are in the unordered list DS2 or if some of the related patches to the current software patch are missing. If all the related patches to the current software patch are in the unordered list DS2 or if some of the related patches to the current software patch are missing, the method returns to step 320 so as to repeat the process for another unordered patch DS1 from the unordered list of software patches DS2; otherwise the method proceeds to the second stage 400 depicted in FIG. 4A.

Figure 4A:
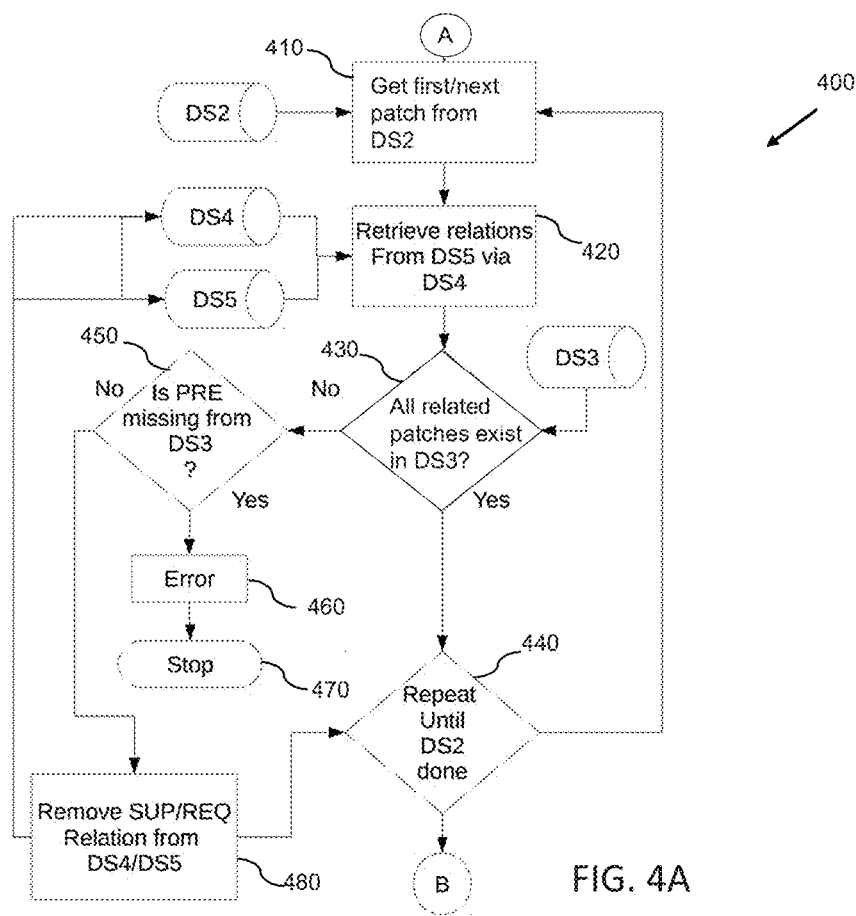
FIG. 4A is a flow diagram of a second stage of the exemplary embodiment of the present invention, wherein the second stage follows the first stage depicted in FIG. 3.

FIG. 4A is a flow diagram of a second stage 400 of the exemplary embodiment of the present invention, wherein the second stage follows the first stage depicted in FIG. 3.

The second stage 400 begins with retrieving a current software patch from the unordered list of software patches DS2. Then, in step 420, the relations for the unordered software patch DS1 are retrieved from the Relations Type map DS5 via the Relations Map DS4.

Next, it is determined in step 430 if the related one or more patches exist in the Supplied Patches Map (DS3). If it is determined in step 430 that the one or more related patches exist in the Supplied Patches Map (DS3), then the method proceeds to step 440 wherein it is determined if all the patches in the unordered list DS2 have been processed. If it is determined in step 440 that all the patches in the unordered list DS2 have not been processed, then the method returns to step 410 to repeat the process for another patch of the unordered list DS2; otherwise the method proceeds to the third stage 500 depicted in FIG. 5A.

However, if it is determined in step 430 that the one or more related patches are not in the Supplied Patches Map DS3, then the method proceeds to step 450 wherein it is determined if a PRE relationship patch does not exist in DS3. If it is determined in step 450 that a PRE relationship patch does not exist in DS3, the method proceeds to step 460 in which an error message or warning is generated and then the method stops in step 470. The same may be done for SUP and REQ relationships miss-ink from DS3, such that an error or message or warning is provided in step 460 if a SUP relationship does not exist in DS3, and/or a REQ relationship is missing from DS3.

If in step 450 it is determined that a PRE relationship patch is not missing from DS3, the method proceeds to step 480 in which unknown SUP/REQ related patches are removed from the Relationship Type Map (DS5) via Relations map (DS4), prior to proceeding step 440 (wherein it is determined if all the patches in the unordered list DS2 have been processed, as detailed above).

Figure 4B:
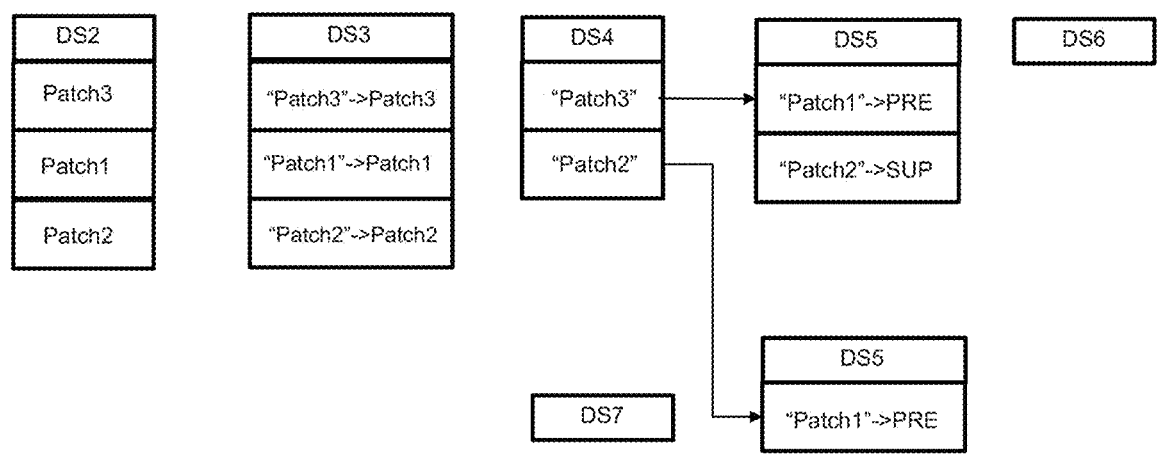
FIG. 4B depicts the state of various data structures after completion of the second stage depicted in FIG. 4A, in accordance with the exemplary embodiment of the present invention.

FIG. 4B depicts the state of the various data structures after completion of the second stage 400 depicted in FIG. 4A, in accordance with the exemplary embodiment of the present invention. From FIG. 4A it can be seen that: the Map of supplied patches keyed by Patch ID DS3 is populated; both the Map of Relations keyed by Patch ID with the value of a Map DS5 and the Map of Relations Types keyed by Related Patch ID and with a value of the Relationship Type DS4 are populated; and a queue of Ordered patches ready to process to build up a component history database DS6 and a list of patches processed in the current iteration of the Unordered List DS7 are both empty.

Figure 5A:
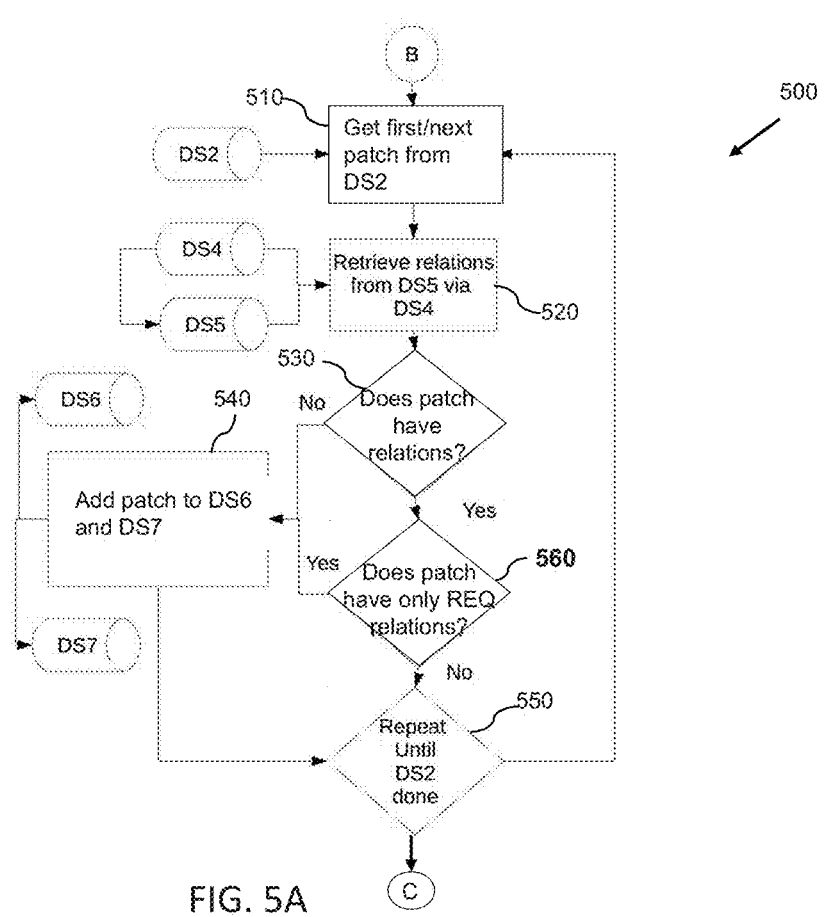
FIG. 5A is a flow diagram of a third stage of the exemplary embodiment of the present invention, wherein the third stage follows the second stage depicted in FIG. 4A.

FIG. 5A is a flow diagram of a third stage 500 of the exemplary embodiment of the present invention, wherein the third stage follows the second stage depicted in FIG. 4A.

Having completed the second stage, all the relationship information is available. The third stage is thus designed to repeatedly iterate the unordered patches list DS2 to add a current patch DS1 to the ordered queue DS6.

The third stage 500 begins with the step 510 of retrieving a current software patch from the unordered list of software patches DS2. Then, in step 520, the relations for the current software patch DS1 are retrieved from the Relations Type map DS5 via the Relations Map DS4.

Next, in step 530, it is determined whether or not the current patch DS1 has any relationships defined.

If it is determined in step 530 that the current patch DS1 has no defined relationships, the method proceeds to step 540 wherein the current patch DS1 is added to the Ordered Patches Queue DS6 and the current patch name is added to the processed patch list DS7, after which the method proceeds to step 550 wherein it is determined if all the patches in the unordered list DS2 have been processed.

If it is determined in step 530 that the current patch DS1 has one or more relationships defined, the method proceeds to step 560 wherein it is determined if the current patch DS1 has only REQ/IFREQ relations. If the result of step 560 is affirmative (i.e. if the current patch DS1 has REQ/IFREQ relations), the method proceeds to step 540 (wherein current patch DS1 is added to the Ordered Patches Queue DS6 and the current patch name is added to the processed patch list DS7). Conversely, if it is determined in step 560 that the current patch DS1 does not have only REQ/IFREQ relations, the method proceeds to step 550 wherein it is determined if all the patches in the unordered list DS2 have been processed.

Figure 6A:
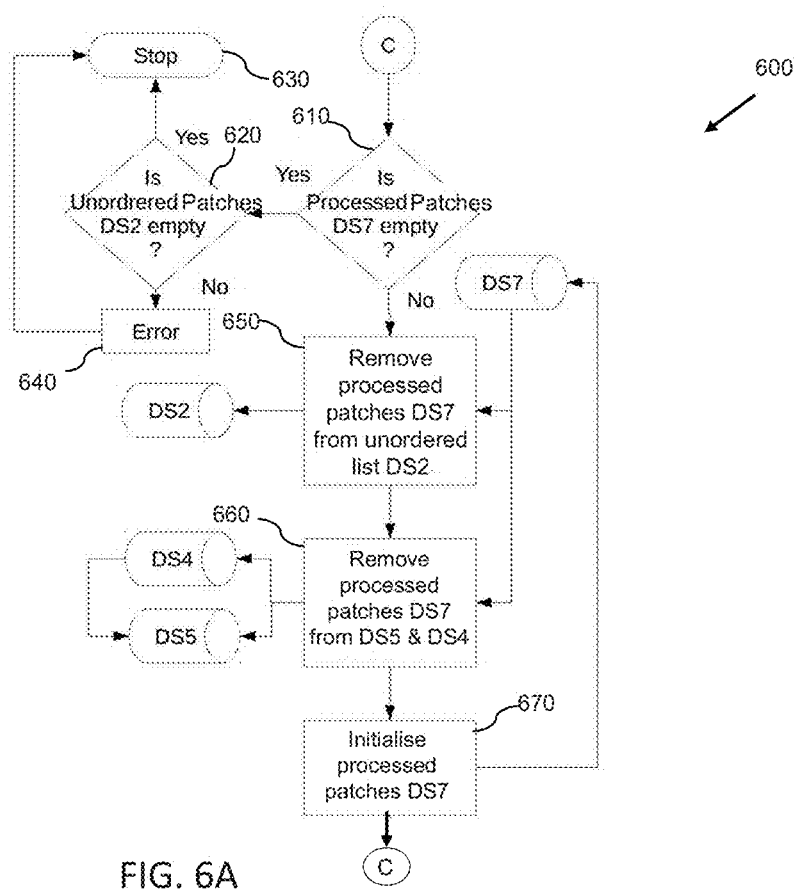
FIG. 6A is a flow diagram of a fourth stage of the exemplary embodiment of the present invention, wherein the fourth stage follows the third stage depicted in FIG. 5A.

If it is determined in step 550 that all the patches in the unordered list DS2 have not been processed, the method returns to step 510 to repeat the process for another patch of the unordered list DS2; otherwise the method proceeds to the fourth stage 600 depicted in FIG. 6A.

Figure 5B:
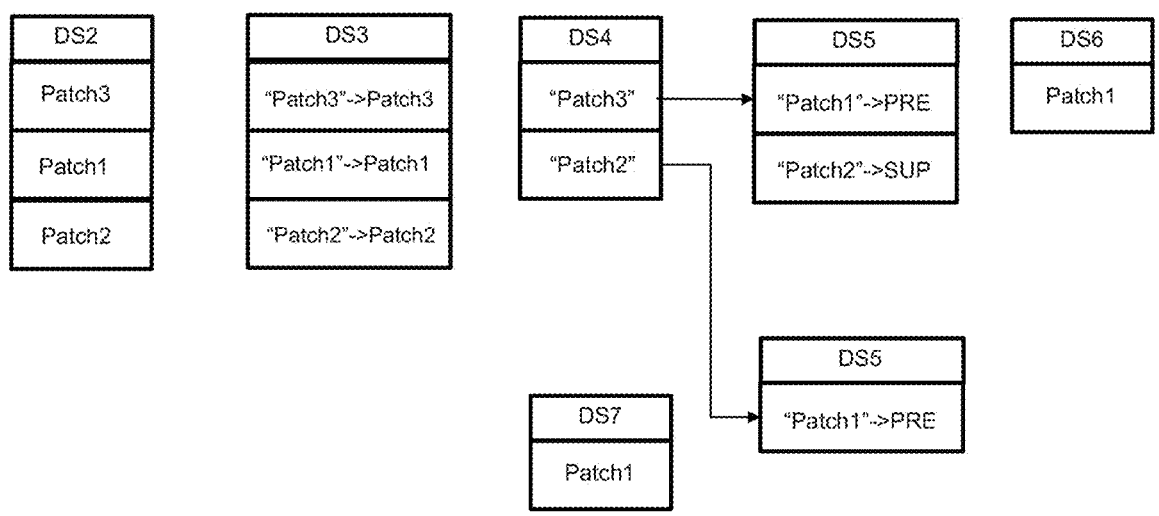
FIG. 5B depicts how various data structures are altered by the third stage depicted in FIG. 5A, in accordance with the exemplary embodiment of the present invention.

FIG. 5B depicts how various data structures are altered by the third stage depicted in FIG. 5A, in accordance with the exemplary embodiment of the present invention. The unordered list DS2 has been iterated across and the patches have relations as follows: Patch 1 has no relations (so Patch 1 is moved to the Ordered Patches Queue DS6 and the patch name is added to the processed patch list DS7); Patch2 has no relations from the Map of Relations Types keyed by Related Patch ID and with a value of the Relationship Type DS4 (so Patch 2 is ignored); and Patch3 has no relations from the Map of Relations Types keyed by Related Patch ID and with a value of the Relationship Type DS4 (so Patch3 is ignored).

FIG. 6A is a flow diagram of a fourth stage 600 of the exemplary embodiment of the present invention, wherein the fourth stage follows the third stage depicted in FIG. 5A.

FIGS. 6B to 6G depict how various data structures are altered by repeatedly undertaking the third and fourth stages of the exemplary embodiment of the present invention.

The fourth stage 600 begins with the step 610 of determining if the list of processed patches DS7 is empty. If it is determined in step 610 that the list of processed patches DS7 is empty, the method proceeds to step 620 wherein it is checked if the unordered list of patches DS2 is also empty. If it is determined in step 620 that the unordered list of patches DS2 is also empty, the method for generating the ordered list of patches in DS6 stops in step 630, otherwise the method proceeds to step 640 wherein an error message or warning is generated.

In one embodiment, step 630 further comprises applying the ordered list of software patches in DS6 to the one or more computer readable software programs, after which the one or more computer readable software programs are, in one embodiment, executed in the computer system.

If, in step 610 it is determined that the list of processed patches DS7 is not empty, the method proceeds to step 650. In step 650, the processed patches of list DS7 are removed from the unordered list of patches DS2, and then, in step 660, the processed patches of list DS7 are removed from the Map of Relations keyed by Patch ID with the value of a Map DS5 and the Map of Relations Types keyed by Related Patch ID and with a value of the Relationship Type DS4, followed by initialization of the processed patches of list DS7 in step 670.

Figure 6B:
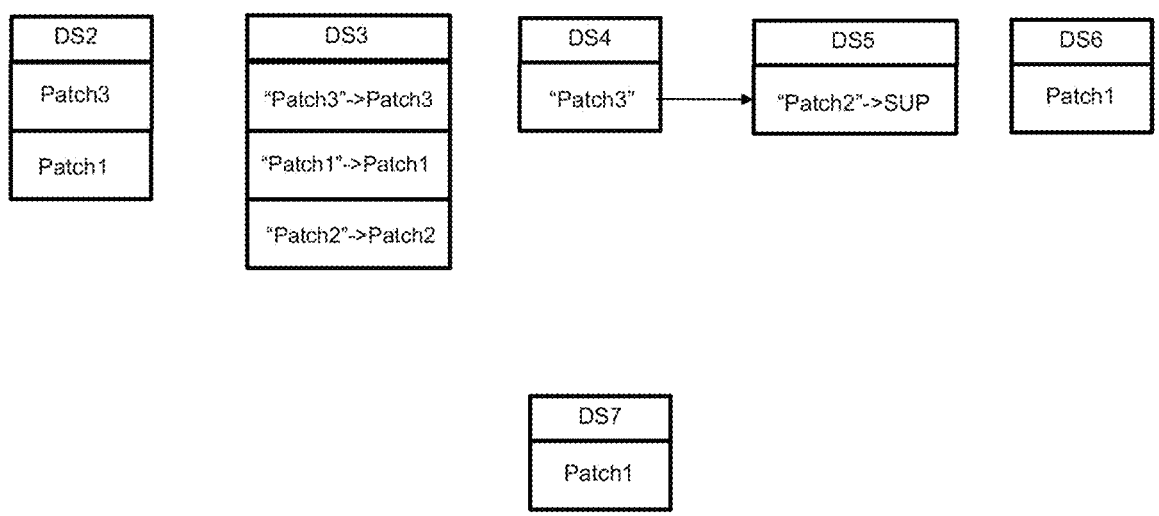
FIGS. 6B to 6G depict how various data structures are altered by repeatedly undertaking the third and fourth stages of the exemplary embodiment of the present invention.

At this point after step 670, the method has made a pass across the unordered list DS2 and added all patches DS1 that did not depend on another patch (or a patch that has been previously processed) to the Ordered Queue DS6, which is depicted in FIG. 6B, wherein the processed patches of list DS7 are removed from the unordered list of patches DS2, and wherein the Map of Relations Map DS5 and the Map of Relations Types DS6 are updated to remove the processed patches of list DS7.

Accordingly, now that a group of patches have been added to DS6 (at completion of the third and fourth stages depicted in FIGS. 5A and 6A, respectively), the third and fourth stages are repeated (so as to undertake another pass) with the remaining unordered patches DS2 (since the dependencies of the remaining unordered patches DS2 may now be satisfied).

Figure 6C:
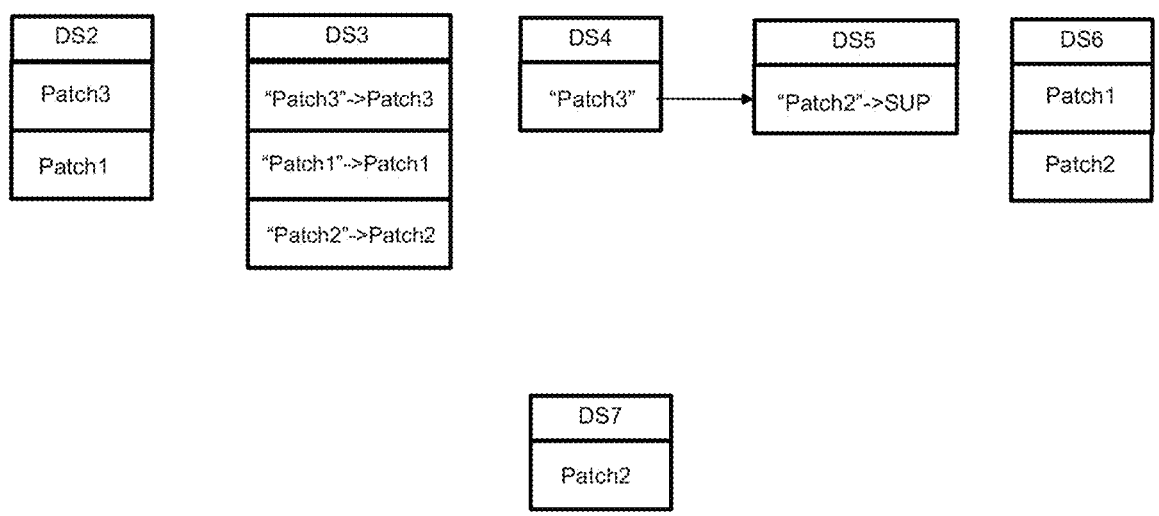
Figure 6D:
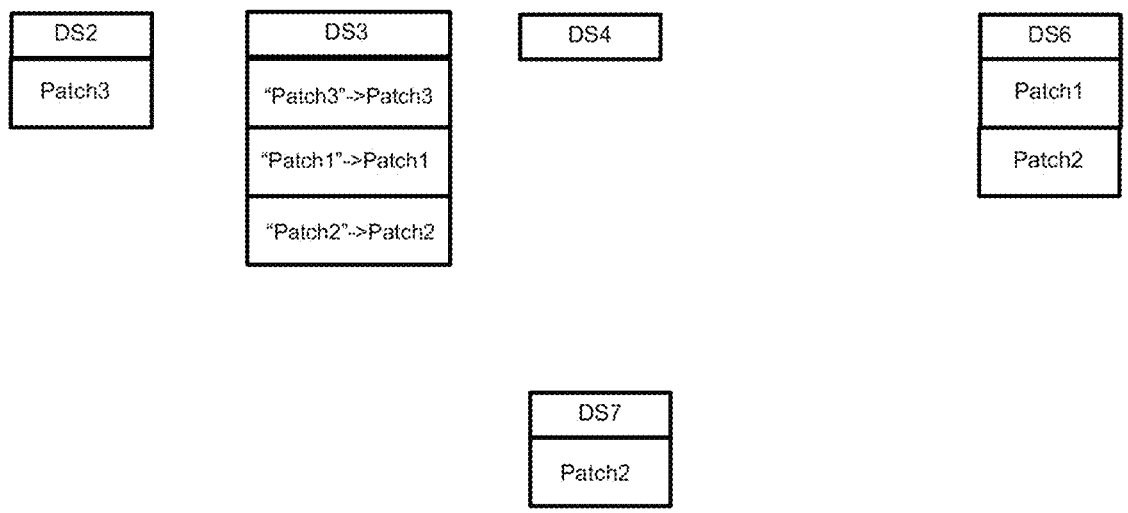
Figure 6E:
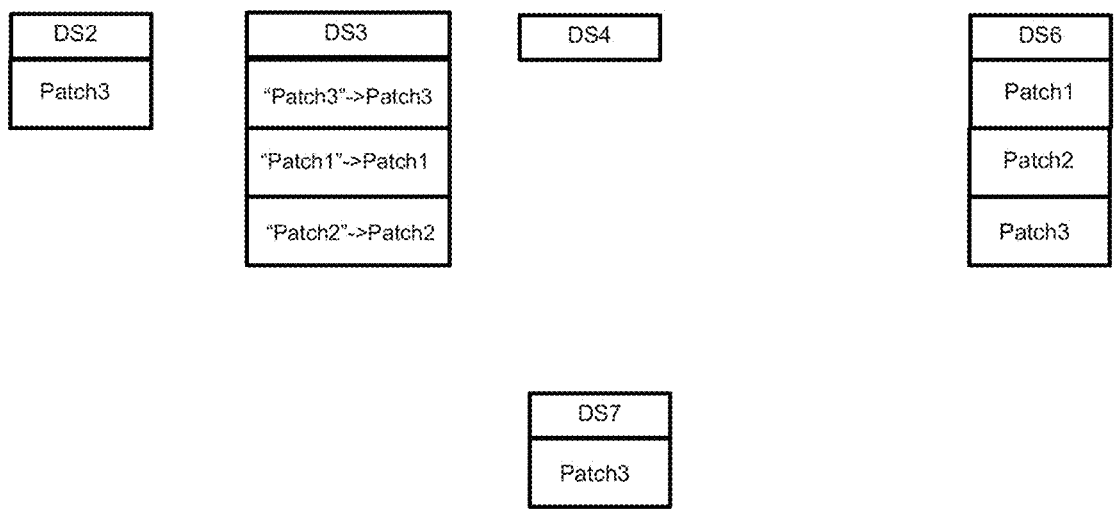
Figure 6F:
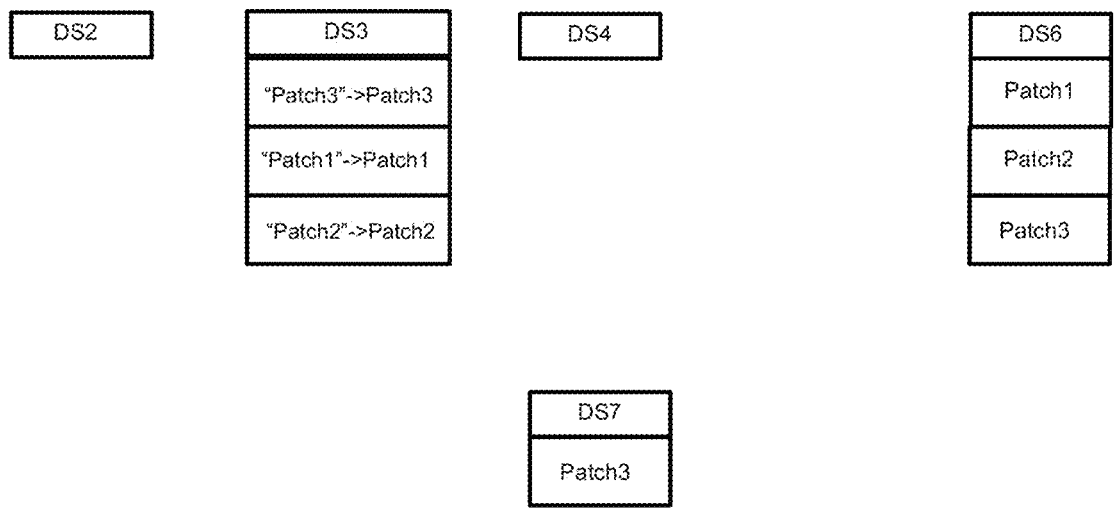
Figure 6G:
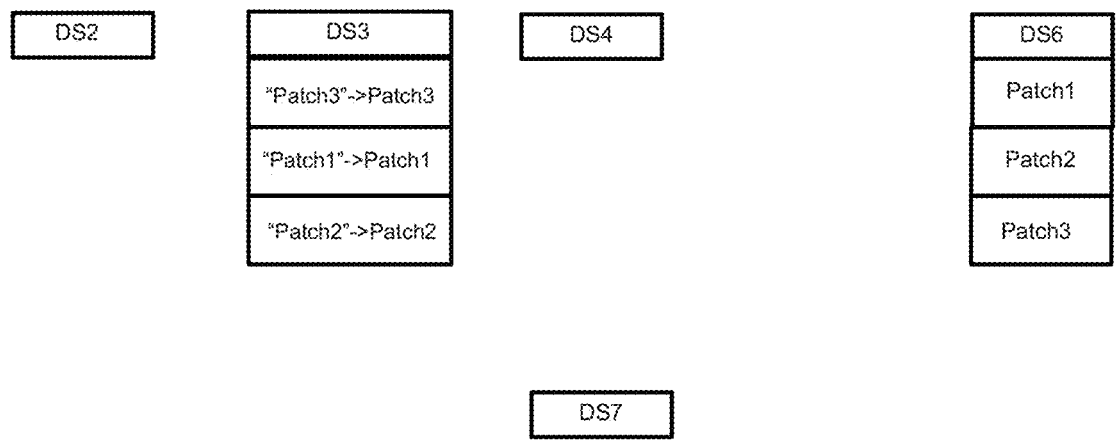

By way of example, FIG. 6C depicts how the various data structures are altered by undertaking the third stage for a second time, and FIG. 6D then depicts how the various data structures are altered by undertaking the fourth stage for a second time. Further, 6E depicts how the various data structures are altered by undertaking the third stage for a third and final time, and FIG. 6F then depicts how the various data structures are altered by undertaking the fourth stage for a third and final time. From the preceding depictions in FIGS. 6C-6F, it is seen how undertaking the fourth stage for a third and final time results in the unordered list of patches DS2 and the list DS7 being empty, such that no patch DS1 is added to processed patches list DS7, so that all patches are ordered in DS6 and the method for generating the ordered list of patches in DS6 ends in step 630 of FIG. 6A. Here, a check can be made that the size of the Unordered List DS2 is zero; if not, then an error message or warning may be generated.

Having ordered the patches based on the relationship data, an import facility may process each patch in order to reproduce a product patch history.

Accordingly, from the above description, it will be understood that a method according to an embodiment of the present invention may be summarized as comprising the following steps:

(i) Look at each unordered patch;
(ii) Store each of unordered patches' dependencies in a dependencies map;
(iii) Loop over the unordered patch list and move each independent patch (patches that have no dependencies) into the ordered patch list;
(iv) Remove the ordered patches from the listed dependencies of the unordered patches in the dependencies map; and
(v) Repeat iteratively until the unordered patch list is empty.

It will be appreciated that such a first embodiment identifies/determines when a relationship is null or empty (i.e., the relationship a patch has with another software patch is zero or none). In this way, a determined relationship that a patch has with a second software patch may be that the relationship is none, zero or null (i.e., the relationship is that the patches are independent from each other).

Alternatively, a method according to a second embodiment of the present invention may be summarized as comprising the following steps:

(i) Look at each unordered patch;
(ii) Store each of unordered patches' dependencies in a dependencies map;
(iii) Loop over the unordered patch list and move each patch that only has dependencies in the ordered patch list (i.e. each patch's dependencies will be satisfied as the dependencies are already ahead of each patch in the list) into the ordered patch list; and
(iv) Repeat iteratively until the unordered patch list is empty.

It will be appreciated the step (iii) is slightly different in the second embodiment from the first embodiment described above, since the second embodiment does not check that a patch is independent (but instead checks that each patch's dependencies are in the ordered list).

Embodiments may therefore be provided as extensions to existing computing systems and/or patch management systems. Such extensions facilitate the creation of a data store comprising component and patch information reflecting the history of component updates/patches/fixes.

In some embodiments, there may be provided a system comprising a processing arrangement adapted to carry out any method previously described with reference to FIGS. 1 to 6.

Figure 7:
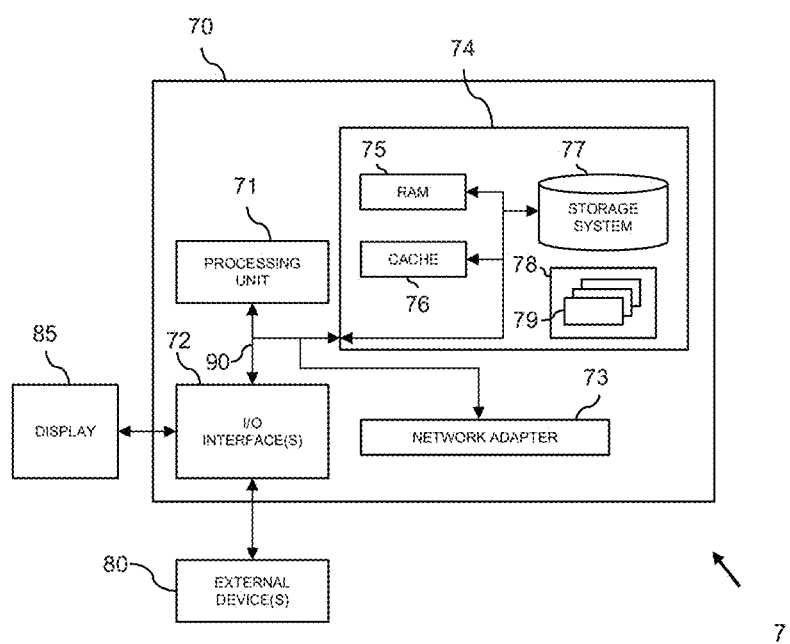
FIG. 7 depicts a computer system/server/data processing system configured to implement embodiments of the present invention.

FIG. 7 depicts a computer system/server/data processing system 70 configured to implement embodiments of the present invention. The computer system/server/data processing system 70 may form part of a networked system. The components of computer system/server/data processing system 70 may include, but are not limited to, one or more processing arrangements, for example comprising processors or processing units 71, a system memory 74, and a bus 90 that couples various system components including system memory 74 to one or more processing units 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server/data processing system 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server/data processing system 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server/data processing system 70 may also communicate with one or more external devices 80 such as a keyboard, a pointing device, a display 85, etc.; one or more devices that enable a user to interact with computer system/server/data processing system 70; and/or any devices (e.g., network card, modem, etc.) that enable computer system/server/data processing system 70 to communicate with one or more other computing devices. Such communication can occur via Input/Output (I/O) interfaces 72. Still yet, computer system/server/data processing system 70 can communicate with one or more networks such as a local area network (LAN), a general wide area network (WAN), and/or a public network (e.g., the Internet) via network adapter 73. As depicted, network adapter 73 communicates with the other components of computer system/server/data processing system 70 via bus 90. It should be understood that although not shown, other hardware and/or software components could be used in conjunction with computer system/server/data processing system 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, party on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a data processing system to implement the methods of the present invention.

A data processing system of the present invention comprises one or more processors, one or more memories, and one or more computer readable hardware storage devices, said one or more hardware storage devices containing program code executable by the one or more processors via the one or more memories to implement the methods of the present invention.

In one embodiment, the data processing system comprises the computer system in which the one or more computer readable software programs are executed.

In one embodiment, the data processing system does not comprise the computer system in which the one or more computer readable software programs are executed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a plurality of unordered software patches for one or more computer readable software programs configured to be executed in a computer system, said method comprising:

generating, by one or more processors of a data processing system, a list (DS2) of N unordered software patches having content therein, each of the N unordered software patches including the content therein being stored in N respective entries of the list DS2, said N being at least 2, said N unordered software patches comprising relationship information for defining relationships among the N unordered software patches;

generating, by the one or more processors, a list (DS3) of the N unordered software patches including the content therein respectively stored in N entries of the list DS3 and respectively corresponding to the N unordered software patches in the N entries of the list DS2, each entry of the list DS3 further comprising an identifier of the unordered software patch stored in said each entry of the list DS3, said lists DS2 and DS3 being different lists;

ascertaining, by the one or more processors, M identifiers of the N identifiers in the list DS3, wherein each of the M unordered software patches associated with the M identifiers has at least one dependency with a respective other software patch, wherein a remaining N minus M unordered software patches in the list DS2 do not have any dependency with any software patch, wherein 1 #M<N, and wherein said ascertaining the M identifiers comprises analyzing the content of the N software patches;

generating, by the one or more processors, a list DS4 of the M identifiers;

generating, by one or more processors, a data structure (DS5) identifying the dependencies of each identifier of the M identifiers in the list DS4, wherein each entry in the data structure DS5 comprises (i) an identifier selected from the list DS3 and (ii) a descriptor that describes a dependency between the software patch having the identifier selected from the list DS3 and a software patch having an identifier selected from the list DS4;

ordering, by the one or more processors, the N unordered software patches in the list DS2 into a list (DS6) of N ordered software patches; and upgrading the one or more computer readable software programs by applying, by the one or more processors, the ordered list DS6 of software patches to the one or more computer readable software programs, wherein the upgraded one or more computer readable software programs are executable in the computer system, wherein said applying the ordered list DS6 of software patches to the one or more computer readable software programs is performed instead of using an existing software patch maintenance system to upgrade the one or more computer readable software programs, and wherein harvesting patch relationship information from the existing software patch maintenance system is impossible.

2. The method of claim 1, wherein the list DS6 is initially a null list having no software patches therein, and wherein said ordering comprises:
   placing, into the list DS6, the remaining N minus M unordered software patches in the list DS2; and
   after said placing, looping over the M identifiers in the list DS4 in an iterative process having M iterations, wherein iteration m (m=1, 2 . . . M) comprises:
      positioning, in the list DS6, the unordered software patch associated with the identifier m in the list DS4, said positioning being performed in consideration of each dependency of at least one dependency of the unordered software patch associated with the identifier m as described in the data structure DS5; and
      removing, from the data structure DS5, the entries comprising the at least one dependency of the unordered software patch associated with the identifier m.

3. The method of claim 1, said method further comprising:
   after said applying the ordered list DS6 of software patches to the one or more computer readable software programs, executing the upgraded one or more computer readable software programs in the computer system.

4. The method of claim 1,
   wherein the N unordered software patches comprises a first software patch and a second software patch of the M unordered software patches having at least one dependency,
   wherein the dependency of the second software patch requires that: the second software patch replace the first software patch, any relationship in the first software patch must be brought forward into the second software patch, and the first software patch is not to be applied to the one or more computer readable software programs, and
   wherein said applying comprises applying the second software patch, and not the first software patch, to the one or more computer readable software programs.

5. A computer program product, comprising one or more computer readable hardware storage devices having computer readable program code stored therein, said program code containing instructions executable by one or more processors of a data processing system to implement a method for processing a plurality of unordered software patches for one or more computer readable software programs configured to be executed in a computer system, said method comprising:
   generating, by the one or more processors, a list (DS2) of N unordered software patches having content therein, each of the N unordered software patches including the content therein being stored in N respective entries of the list DS2, said N being at least 2, said N unordered software patches comprising relationship information for defining relationships among the N unordered software patches;
   generating, by the one or more processors, a list (DS3) of the N unordered software patches including the content therein respectively stored in N entries of the list DS3 and respectively corresponding to the N unordered software patches in the N entries of the list DS2, each entry of the list DS3 further comprising an identifier of the unordered software patch stored in said each entry of the list DS3, said lists DS2 and DS3 being different lists;
   ascertaining, by the one or more processors, M identifiers of the N identifiers in the list DS3, wherein each of the M unordered software patches associated with the M identifiers has at least one dependency with a respective other software patch, wherein a remaining N minus M unordered software patches in the list DS2 do not have any dependency with any software patch, wherein 1 #M<N, and wherein said ascertaining the M identifiers comprises analyzing the content of the N software patches;
   generating, by the one or more processors, a list DS4 of the M identifiers;
   generating, by one or more processors, a data structure (DS5) identifying the dependencies of each identifier of the M identifiers in the list DS4, wherein each entry in the data structure DS5 comprises (i) an identifier selected from the list DS3 and (ii) a descriptor that describes a dependency between the software patch having the identifier selected from the list DS3 and a software patch having an identifier selected from the list DS4;
   ordering, by the one or more processors, the N unordered software patches in the list DS2 into a list (DS6) of N ordered software patches; and
   upgrading the one or more computer readable software programs by applying, by the one or more processors, the ordered list DS6 of software patches to the one or more computer readable software programs, wherein the upgraded one or more computer readable software programs are executable in the computer system, wherein said applying the ordered list DS6 of software patches to the one or more computer readable software programs is performed instead of using an existing software patch maintenance system to upgrade the one or more computer readable software programs, and wherein harvesting patch relationship information from the existing software patch maintenance system is impossible.

6. The computer program product of claim 5, wherein the list DS6 is initially a null list having no software patches therein, and wherein said ordering comprises:
   placing the N minus M unordered software patches in the list DS2; and
   after said placing, looping over the M identifiers in the list DS4 in an iterative process having M iterations, wherein iteration m (m=1, 2 . . . M) comprises:
      positioning, in the list DS6, the unordered software patch associated with the identifier m in the list DS4, said positioning being performed in consideration of each dependency of at least one dependency of the unordered software patch associated with the identifier m as described in the data structure DS5; and
      removing, from the data structure DS5, the entries comprising the at least one dependency of the unordered software patch associated with the identifier m.

7. The computer program product of claim 5, said method further comprising:
   after said applying the ordered list DS6 of software patches to the one or more computer readable software programs, executing the upgraded one or more computer readable software programs in the computer system.

8. The computer program product of claim 5, wherein the data processing system comprises the computer system.

9. The computer program product of claim 5,
wherein the N unordered software patches comprises a first software patch and a second software patch of the M unordered software patches having at least one dependency,
wherein the dependency of the second software patch requires that: the second software patch replace the first software patch, any relationship in the first software patch must be brought forward into the second software patch, and the first software patch is not to be applied to the one or more computer readable software programs, and
wherein said applying comprises applying the second software patch, and not the first software patch, to the one or more computer readable software programs.

10. A data processing system, comprising one or more processors, one or more memories, and one or more computer readable hardware storage devices, said one or more hardware storage device storing program code executable by the one or more processors via the one or more memories to implement a method for processing a plurality of unordered software patches for one or more computer readable software programs configured to be executed in a computer system, said method comprising:

generating, by the one or more processors, a list (DS2) of N unordered software patches having content therein, each of the N unordered software patches including the content therein being stored in N respective entries of the list DS2, said N being at least 2, said N unordered software patches comprising relationship information for defining relationships among the N unordered software patches;

generating, by the one or more processors, a list (DS3) of the N unordered software patches including the content therein respectively stored in N entries of the list DS3 and respectively corresponding to the N unordered software patches in the N entries of the list DS2, each entry of the list DS3 further comprising an identifier of the unordered software patch stored in said each entry of the list DS3, said lists DS2 and DS3 being different lists;

ascertaining, by the one or more processors, M identifiers of the N identifiers in the list DS3, wherein each of the M unordered software patches associated with the M identifiers has at least one dependency with a respective other software patch, wherein a remaining N minus M unordered software patches in the list DS2 do not have any dependency with any software patch, wherein 1 #M<N, and wherein said ascertaining the M identifiers comprises analyzing the content of the N software patches;

generating, by the one or more processors, a list DS4 of the M identifiers;

generating, by one or more processors, a data structure (DS5) identifying the dependencies of each identifier of the M identifiers in the list DS4, wherein each entry in the data structure DS5 comprises (i) an identifier selected from the list DS3 and (ii) a descriptor that describes a dependency between the software patch having the identifier selected from the list DS3 and a software patch having an identifier selected from the list DS4;

ordering, by the one or more processors, the N unordered software patches in the list DS2 into a list (DS6) of N ordered software patches; and upgrading the one or more computer readable software programs by applying, by the one or more processors, the ordered list DS6 of software patches to the one or more computer readable software programs, wherein the upgraded one or more computer readable software programs are executable in the computer system, wherein said applying the ordered list DS6 of software patches to the one or more computer readable software programs is performed instead of using an existing software patch maintenance system to upgrade the one or more computer readable software programs, and wherein harvesting patch relationship information from the existing software patch maintenance system is impossible.

11. The data processing system of claim 10, wherein the list DS6 is initially a null list having no software patches therein, and wherein said ordering comprises:

placing the N minus M unordered software patches in the list DS2; and after said placing, looping over the M identifiers in the list DS4 in an iterative process having M iterations, wherein iteration m (m=1, 2 . . . M) comprises:

positioning, in the list DS6, the unordered software patch associated with the identifier m in the list DS4, said positioning being performed in consideration of each dependency of at least one dependency of the unordered software patch associated with the identifier m as described in the data structure DS5; and removing, from the data structure DS5, the entries comprising the at least one dependency of the unordered software patch associated with the identifier m.

12. The data processing system of claim 10, said method further comprising:

after said applying the ordered list DS6 of software patches to the one or more computer readable software programs, executing the upgraded one or more computer readable software programs in the computer system.

13. The data processing system of claim 10, wherein the data processing system comprises the computer system.

14. The data processing system of claim 10,
wherein the N unordered software patches comprises a first software patch and a second software patch of the M unordered software patches having at least one dependency,
wherein the dependency of the second software patch requires that: the second software patch replace the first software patch, any relationship in the first software patch must be brought forward into the second software patch, and the first software patch is not to be applied to the one or more computer readable software programs, and
wherein said applying comprises applying the second software patch, and not the first software patch, to the one or more computer readable software programs.

* * * * *